US010705036B2

(12) United States Patent
Antici et al.

(10) Patent No.: US 10,705,036 B2
(45) Date of Patent: Jul. 7, 2020

(54) METHOD AND SYSTEM FOR ANALYSIS OF OBJECTS

(71) Applicants: INSTITUT NATIONAL DE LA RECHERCHE SCIENTIFIQUE, Quebec (CA); Università della Calabria, University of Calabria, Rende (IT)

(72) Inventors: Patrizio Antici, Montreal (CA); Marianna Barberio, Crucoli (IT)

(73) Assignees: UNIVERSITÁ DELLA CALABRIA, Rende (IT); INSTITUT NATIONAL DE LA RECHERCHE SCIENTIFIQUE, Québec (CA)

( * ) Notice: Subject to any disclaimer, the term of this patent is extended or adjusted under 35 U.S.C. 154(b) by 0 days.

(21) Appl. No.: 15/877,503

(22) Filed: Jan. 23, 2018

(65) Prior Publication Data

US 2018/0209925 A1    Jul. 26, 2018

Related U.S. Application Data

(60) Provisional application No. 62/449,333, filed on Jan. 23, 2017.

(51) Int. Cl.
*G01N 23/00* (2006.01)
*G01N 23/2257* (2018.01)

(52) U.S. Cl.
CPC ... *G01N 23/2257* (2013.01); *G01N 2223/615* (2013.01)

(58) Field of Classification Search
CPC .............. G01N 23/2257; G01N 2223/615

USPC .................................................. 250/306, 307
See application file for complete search history.

(56) References Cited

U.S. PATENT DOCUMENTS

| 2010/0003770 | A1* | 1/2010 | Shibata | .............. H01L 22/12 438/5 |
| 2010/0027748 | A1* | 2/2010 | Rohde | .............. G01N 23/2252 378/82 |
| 2015/0196779 | A1* | 7/2015 | Tonner | .............. A61N 5/1048 600/1 |

OTHER PUBLICATIONS

Borghesi, et al ("Electric field detection in laser-plasma interaction experiments via the proton imaging technique," Physics of Plasmas, vol. 9, No. 5, May 2002, pp. 2214-2220 (Year: 2002).*
Borghesi, et al "Electric field detetion in laser-plasma interaction experiments via the proton imaging technique," Physics of Plasmas , vol. 9, No. 5, May 2002, pp. 2214-2220 (Year: 2002).*
Yogo A. et al., Measurement of relative biological effectiveness of protons in human cancer cells using a laser-driven quasimonoenergetic proton beamline, Appl. Phys. Lett. 98, 053701 (2011).

(Continued)

*Primary Examiner* — Michael Maskell

(57) ABSTRACT

A spectroscopy method and system, the method comprising irradiating an object with a laser-accelerated particle beam and detecting photons emitted by the object as a result of the interaction between the laser-accelerated particle beam and the object. The system comprises a laser; a particle source, positioned at a distance from the object; and a spectrometer and a detector; wherein the particle source generates a laser-accelerated particle beam under irradiation by the laser; and the spectrometer and the detector detect photons emitted from the object under irradiation by the laser-accelerated particle beam.

19 Claims, 6 Drawing Sheets

(56) References Cited

OTHER PUBLICATIONS

Zeil K. et al., The scaling of proton energies in ultrashort pulse laser plasma acceleration, New J. Phys. 12, 045015 (2010).
Barberio, M. et al., Nanostructured target fabrication with metal and semiconductor nanoparticles, Mater. Res. Express 2 (2015) 105005.
Chen, S.N. et al., Collimated protons accelerated from an overdense gas jet irradiated by a 1 μm wavelength high-intensity short-pulse laser, Scientific Reports, 7:13505 (2017).
Gauthier, M. et al., High-intensity laser-accelerated ion beam produced from cryogenic micro-jet target, Review of Scientific Instruments 87, 11D827 (2016).
Maenhaut, W. et al., Applications of pixe to biological and biomedical samples at the University of Gent, Nuclear Instruments and Methods in Physics Research, B22, 138-144 (1987).
Schleifer, E. et al., Proton acceleration by ultrashort intense laser interaction with microstructured snow targets, Appl. Sci., 5, 459-471 (2015).
Albertazzi B. et al., Longitudinal proton probing of ultrafast and high-contrast laser-solid interactions, EPJ Web of conferences 59, 17014 (2013).
Antici P. et al., Isochoric heating of matter by laser-accelerated high-energy protons, J. Phys. IV 133, 1077-1079 (2006).
Antici P. et al., Numerical study of a linear accelerator using laser-generated proton beams as a source, Journal of Appl. Physics 104, 124901 (2008).
Antici P. et al., A compact post-acceleration scheme for laser-generated protons, Phys. Plasmas 18, 073103 (2011).
Artioli G., Scientific Methods and Cultural Heritage, Oxford University Press, Oxford (2010).
Baglioni P., Carretti E. and Chelazzi D., Nanomaterials in art conservation, Nature Nanotechnology 10, 287-290, (2015).
Barberio, M. et al., Laser-accelerated proton beams as diagnostics for cultural heritage, Scientific Reports, 7:40415 (2017).
Bawaya M., Salvaging Science, Science 347, 6218, 117-119 (2015).
Bin J. et al., A laser-driven nanosecond proton source for radiobiological studies, Appl. Phys. Lett. 101, 243701 (2012).
Bitossi G., Giorgi R., Mauro M., Salvadori B. And Dei L., Spectroscopic techniques in cultural heritage conservation: a survey, Applied Spectroscopy Reviews 40, 187-228 (2005).
Bonnet T., et al., Rev. Sci. Instrum., Response functions of Fuji imaging plates to monoenergetic protons in the energy range 0.6-3.2 MeV, 84, 013508 (2013).
Borghesi M. et al., Multi-MeV Proton Source Investigations in Ultraintense Laser-Foil Interactions, Phys. Rev. Lett. 92, 055003 (2004).
Buffechoux, S. et al., Hot Electrons Transverse Refluxing in Ultraintense Laser-Solid Interactions, Phys. Rev. Lett. 105, 015005 (2010).
Bulanov S. V. and Khoroshkov V. S., Feasibility of using laser ion accelerators in proton therapy, Plasma Phys. Rep. 28, 453-456 (2002).
Busold S. et al., Towards highest peak intensities for ultra-short MeV-range ion bunches, Scientific Reports 5, 12459 (2015).
Carbó A. D, Electrochemistry for conservation science, J. Solid State Electrochem. 14, 349-351 (2010).
Chen S. N. et al., Monochromatic short pulse laser produced ion beam using a compact passive magnetic device, Rev. Sci. Instrum. 85, 043504 (2014).
Chiari G., Saving art in situ, Nature 453, 159 (2008).
Cohen D.D., Harrigan M., Atomic Data Nucl Data Tables, 33, 255 (1985).
Cowan T. E. et al., Ultralow Emittance, Multi-MeV Proton Beams from a Laser Virtual-Cathode Plasma Accelerator, Phys. Rev. Lett. 92, 204801 (2004).
Doria D. et al., Biological effectiveness on live cells of laser driven protons at dose rates exceeding 109 Gy/s, AIP Advances 2, 011209 (2012).
Fourmaux S. et al., Investigation of laser-driven proton acceleration using ultra-short, ultraintense laser pulses, Phys. Plasmas 20, 013110 (2013).
Fuchs J. et al., Comparison of Laser Ion Acceleration from the Front and Rear Surfaces of Thin Foils, Phys. Rev. Lett. 94, 045004 (2005).
Fuchs J. et al., Laser-driven proton scaling laws and new paths towards energy increase, Nature Physics 2, 48-52 (2006).
Giarola M., Mariotto G., Barberio M., Ajò D., Raman spectroscopy in gemmology as seen from a 'jeweller's' point of view, Journal of Raman Spectroscopy 43, 1828-1832 (2011).
Giuntini L, Massi M., Calusi S., the external scanning proton microprobe of Firenze: A comprehensive description, Nucl. Instr. and Meth. A 576, 266-273 (2007).
Grassi N. et al., Differential PIXE measurements for the stratographic analysis, X-ray Spectrom., 34, 306-309 (2005).
Green J. S. et al., High efficiency proton beam generation through target thickness control in femtosecond laser-plasma interactions, Appl. Phys. Lett. 104, 214101 (2014).
Janssens K., Van Grieken R., Non destructive microanalysis of Cultural Heritage Materials, Wilson 6 Wilson's, Amsterdam (2004).
La recherche au musée du Louvre 2012, Musée du Louvre, Paris, ISBN 978-2-35031-483-9 and Louvre Laboratory web site: http://c2rmf.fr/.
Malka V. et al., Practicability of proton therapy using compact laser systems, Med. Phys. 31, 1587-1592 (2004).
Mancic A., Fuchs J., Antici P., Gaillard S. A., and Audebert P., Absolute calibration of photostimulable Image plate detectors used as (0.5-20 MeV) high-energy proton detectors, Rev. Sci. Intrum., 79, 073301 (2008).
Mancic A. et al., Isochoric heating of solids by laser-accelerated protons: Experimental characterization and self-consistent hydrodynamic modeling, High Energy Density Physics 6, 21 (2010).
Massi M., Giuntini L., Chiari M., Gelli N., Mandò P.A., The external beam microprobe facility in Florence: Setup and performance, Nucl. Instr. and Meth. B 190, 276-282 (2002).
Metzkes J. et al., Preparation of laser-accelerated proton beams for radiobiological applications, Nucl. Instr. and Meth. A 653, 172 (2011).
Patel R K. et al., Isochoric Heating of Solid-Density Matter with an Ultrafast Proton Beam, Phys. Rev. Lett. 91, 125004 (2003).
Renzelli D et al., SAR TL dating of neolithic and medieval ceramics from Lamezia, Calabria (South Italy): a case study, Mediterranean Archaeology and Archaeometry, 13, 1, 277 (2013).
Robson L. et al., Scaling of proton acceleration driven by petawatt-laser-plasma interactions, Nature Physics 3, 58-62 (2007).
Romagnani L. et al., Dynamics of electric fields driving laser acceleration of multi-MeV protons, Phys. Rev. Lett. 95, 195001 (2005).
Roth M. et al., Fast Ignition by Intense Laser-Accelerated Proton Beams, Phys. Rev. Lett. 86, 436-439 (2001).
Roth, M. et al., Energetic ions generated by laser pulses: A detailed study on target properties, The American Physical Society, Physical Review Special Topics—Accelerators and Beams, vol. 5, 061301 (2002).
Salomon J. et al., Cultural heritage materials: art conservation and restoration, Appl. Phys. A 92, 93 (2008).
Schollmeier M. et al., Controlled Transport and Focusing of Laser-Accelerated Protons with Miniature Magnetic Devices, Phys. Rev. Lett. 101, 055004 (2008).
Schreiner M. et al., Scanning electron microscopy and energy dispersive analysis: applications in the field of cultural heritage, Anal Bioanal Chem, 387:737-747 (2007).
Scuderi V. et al., Development of an energy selector system for laser-driven proton beam applications, Nuclear Instruments and Methods in Physics Research A, 740, 8793 (2014).
Seely J. F. et al., K-shell spectra from Ag, Sn, Sm, Ta, and Au generated by intense femtosecond laser pulses, High Energy Density Physics 3, 263 (2007).
Seely, J.F., et al., Gamma ray spectra from targets irradiated by picosecond lasers, High Energy Density Physics 7, 150-154 (2011).
Titan Laser characteristic: https://jlf.llnl.gov/ (2015) (Date of access: May 5, 2016).
Van Grieken R.E., Markowicz A. A., Handbook of X-Ray Spectrometry, second edition, Marcel Dekker, Inc, New York (2002).

(56) References Cited

OTHER PUBLICATIONS

Wilks S. C., Kruer W. L., Tabak M. and Langdon A. B., Absorption of ultra-intense laser-pulses, Phys. Rev. Lett., 69, 1383 (1992).

* cited by examiner

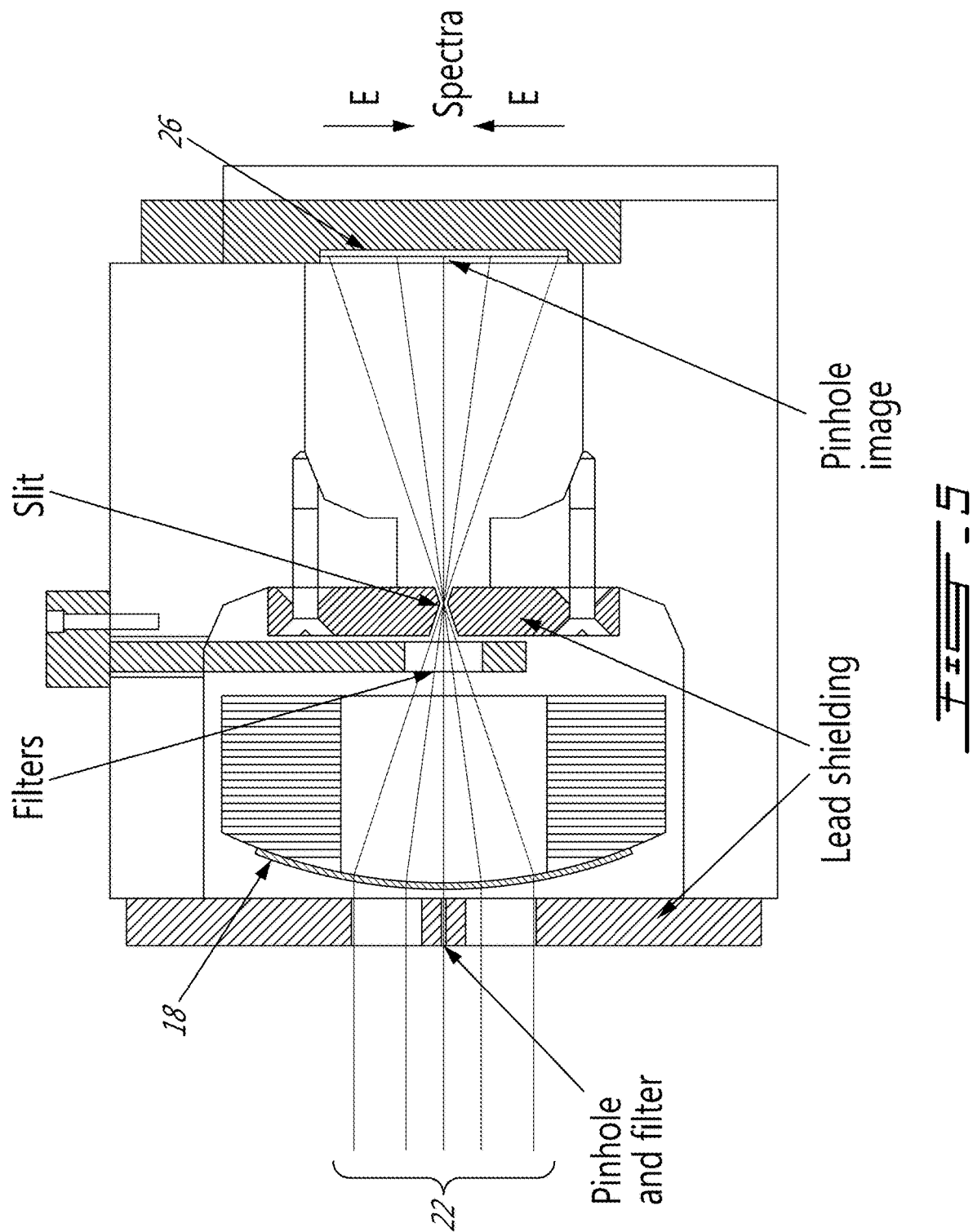

METHOD AND SYSTEM FOR ANALYSIS OF OBJECTS

CROSS REFERENCE TO RELATED APPLICATIONS

This application claims benefit of U.S. provisional application Ser. No. 62/449,333, filed on Jan. 23, 2017. All documents above are incorporated herein in their entirety by reference.

FIELD OF THE INVENTION

The present invention relates to particle-induced X-ray emission spectroscopy. More specifically, the present invention is concerned with a method and system for the analysis of objects.

BACKGROUND OF THE INVENTION

In the last decades, a strong effort has been put into research of innovative techniques in the field of physics and chemistry applied to Cultural Heritage for both analysis and conservation. Currently, many groups worldwide explore the possibility of developing equipment for the analysis and conservation of artifacts [1, 2], the main challenge being to obtain the more information possible without causing damage to the artifacts [3].

Classical techniques for diagnosis and conservation, as well as for restoration and consolidation, typically require transferring the artworks to be analyzed from a museum or an archeological site to a laboratory, or collecting micro-objects of the artworks [4]. Chemical information on the artworks, in relation for example to ceramic, bronzes, metals and/or pigments, may be obtained using surface spectroscopies, such as photoluminescence, Raman, X-ray photoelectron spectroscopy (XPS), X-ray-fluorescence (XRF), energy dispersive X-ray fluorescence (EDX) in scanning electron microscopy SEM, while morphological information may be obtained with scanning electron microscopy (SEM) [5]. A complete chemical characterization of bulk material may be obtained using more sophisticated, and therefore expensive, nuclear physical techniques such as particle-induced X-ray emission (PIXE) and particle-induced gamma-ray emission (PIGE) [6, 7].

Classical particle-induced X-ray emission (PIXE) and particle-induced gamma-ray emission (PIGE) comprises using heavy charged particles, such as protons, alfa-particles or sometimes heavy ions, to create inner-shell vacancies in the atoms of the object under analysis. As in the X-ray fluorescence spectroscopy and electron probe microanalysis, the X-rays and Gamma-rays produced by de-excitation of the vacancies can be measured by an energy-dispersive detection system, yielding a characteristic fingerprint of each chemical element present in the analysed bulk specimen. The incident charged-particle beam, typically consisting of protons with a mean energy of 1-5 MeV, is classically produced by a small Van de Graff accelerator or a compact cyclotron.

The advantage of using particle-induced X-ray emission (PIXE)—in the following only PIXE will be mentioned, but the same applies for PIGE when considering Gamma-rays—compared to other X-ray spectroscopies is that protons, as opposed to X-rays, can be focused and transported by electrostatic or electromagnetic devices and optics and thus can be transported over large distances without loss in the beam intensity (pencil scanning). As a result, the incident fluences on the objects are generally much higher in the particle-induced X-ray emission (PIXE) than in ordinary, true-excited X-ray Fluorescence (XRF).

Moreover, particle-induced X-ray emission (PIXE) allows performing analysis with variable spatial resolution, since protons can be focused and guided down to a beam diameter in the micrometer range. Also, the relative detection limits of particle-induced X-ray emission (PIXE) are typically two orders of magnitude better than in X-ray-fluorescence (XRF) and other electron spectroscopies such as energy dispersive X-ray fluorescence (EDX) or Auger.

Currently, PIXE is used for the analysis of a wide range of materials from proteins to cells and tissues, from polymers to ancient pigments and artefacts. Typically, in the classical particle-induced X-ray emission (PIXE) analysis of proteins or tissues, an incident proton beam, of a mean energy of about 2.5 MeV and beam current ranging from 10 nA to 150 nA, generates a spectrum with an X-ray count rate in the order of 800-2000 counts/seconds [8].

All above-mentioned techniques suffer limitations. For example, Raman and photoluminescence spectroscopy techniques require sophisticated spectrometers and lasers [9]; SEM and XPS require vacuum conditions; PIXE and PIGE require conventional particles using conventional particle accelerators, with beam energies typically ranging from a few keV to a maximum of a few MeV, which are typically available only in dedicated laboratories, since their operation requires particular analysis conditions, such as ultra-high vacuum conditions and strongly controlled temperatures [10].

Moreover, these techniques allow studying only the first superficial layers of the pieces, therefore limiting the analysis to the corrosive surface patina or to the decoration of the surface thereof, without yielding important information about the bulk material. Moreover, as they involve beam spot of a size generally of the order of $\mu m^2$, they are only able to efficiently analyze small surfaces, which makes a complete analysis of larger surfaces very time consuming in so-called pencil-scanning analysis.

For example, PIXE and PIGE spectroscopy, performed on ones of the most relevant facilities in the field Cultural Heritage studies, such as the AGLAE [5] facility located at the French Louvre Laboratory C2RMF [11] or INFN-LABEC laboratory [12, 13] located in Florence, with a conventional accelerator producing proton energies ranging from 1 to 5 MeV and a beam current of the order of tens of pA to few nA, use spot sizes of the order of a few tens of microns, up to 500 µm, and require scanning the regions of interest using between tens and hundreds of points, each point taking about 100-9000 s of measuring time, to yield a complete information. A drawback of a long analysis time is that accumulation of the proton dose can damage the artifacts [14]. Moreover, the maximum analysis depth that can be obtained using these accelerator facilities is between 2 and 20 microns for typical biological film or bronze "cancer", i. e. cuprite and malachite.

Finally, these classical techniques discussed hereinabove are typically not very easily tunable and adaptable, i.e. typically, tuning the energy of the accelerated beam takes at least tens of minutes, and their use is limited to only a certain field of energy range and to micrometric surface areas.

Scanning large bulk volumes is useful as it allows quickly identifying the presence of chemical elements, such as harmful elements for example, in the bulk. If needed, a more precise investigation can then be performed with a higher resolution, i.e. a smaller spot size and a more precise depth, in the considered volume in order to find harmful elements for example on the one hand. On the other hand, for example if no harmful elements could be detected on the larger volume, the scanned area may be characterized as "clean/healthy", and the analysis can continue on another part of the artefact.

There is still a need in the art for a system and a method for spectroscopy of an object.

SUMMARY OF THE INVENTION

More specifically, in accordance with the present invention, there is provided a spectroscopy method, comprising irradiating an object with a laser-accelerated particle beam and detecting photons emitted by the object as a result of the interaction between the laser-accelerated particle beam and the object.

There is further provided a system for spectroscopy of an object, comprising a laser; a particle source, positioned at a distance from the object; and a spectrometer and a detector; wherein the particle source generates a laser-accelerated particle beam under irradiation by the laser; and the spectrometer and the detector detect photons emitted from the object under irradiation by the laser-accelerated particle beam.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 5 shows details of a system according to an embodiment of an aspect of the present invention.

DESCRIPTION OF EMBODIMENTS OF THE INVENTION

In a nutshell, there is provided a method and a system particle-induced X-ray emission spectroscopy, for analysis of objects, such as artworks and artifacts in the field of Cultural Heritage, or in the field of material science and the biomedical field for example.

High-power, ultra-short lasers allow laser-based particle acceleration, including ion acceleration [15, 16], and thus generation of laser-accelerated ion beams, such as proton beams of heavier ions beams, having specific characteristics such as compactness, efficiency, versatility and tunability. These laser-accelerated ion beams are characterized by high current (kA), strong laminarity at the source, i.e. emittance below 100 times better than conventional accelerators, short duration, typically of the order of ps at the particle source, and small source size, i.e. of the order of tens of μm [17]. The energy of the accelerated particles that can be achieved is ever increasing. Existing multi-hundred-TW table-top laser systems generating on-target intensities of about $10^{15}$-$10^{20}$ W/cm$^2$ can routinely reach ion energies of about 15-20 MeV/mu, even up to 85 MeV for protons and 45/u for carbons, with estimations at 00 MeV/u pour iron.

Figure 1A:
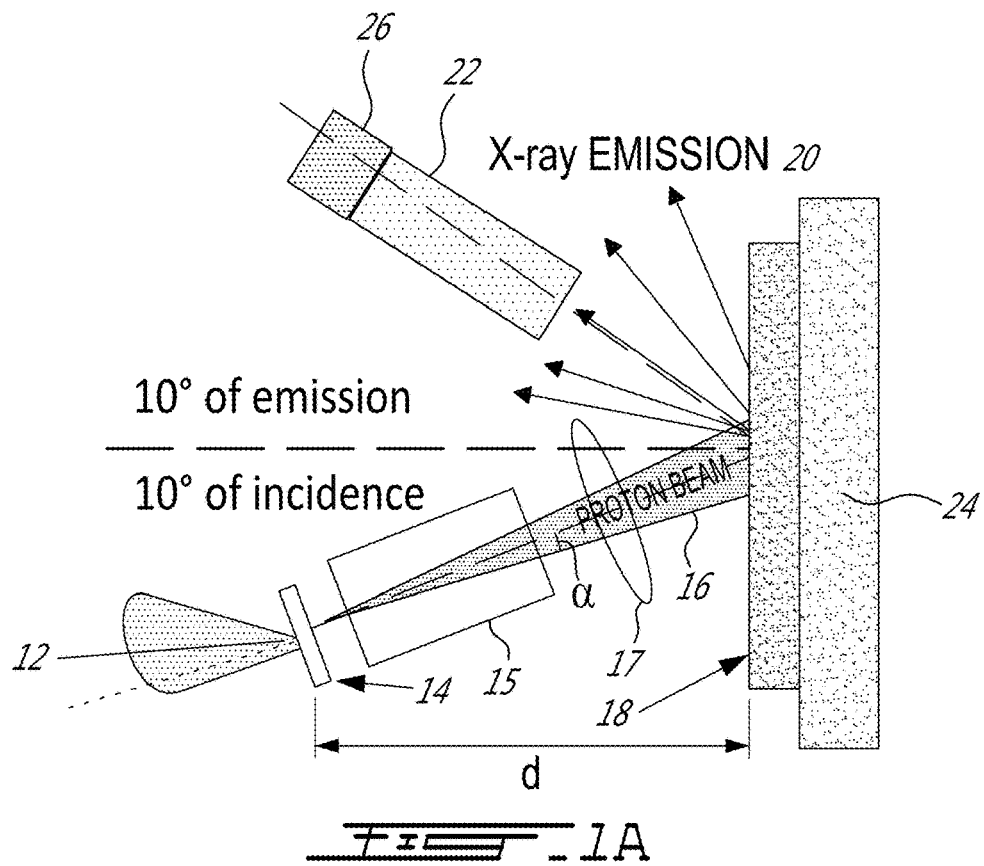
FIG. 1A is a diagrammatic view of a system according to an embodiment of an aspect of the present invention.

FIG. 1A illustrates a system according to an embodiment of an aspect of the present invention. The system comprises a high-power laser 12 and a target 14 acting as a particle source 14. The laser-generated ion beam 16 is used to irradiate an object 18 to be probed, positioned at a variable distance (d) from the particle source 14. X/Gamma-rays 20, emitted in the interaction between the laser-generated ion beam 16 and the object 18 to be probed, are detected by a detector 26 that monitors the interaction region.

The ion source 14 is a target producing laser-accelerated ions, such as protons or heavier ions. It may be a solid target such as an Al solid target or an Ag solid target for example, or nano or micrometric solid foils, including diamond-like carbon foils for example, or gas jet targets [26B], or cryogenic targets [26C], or microstructured targets [26D].

A number of preliminary simulations were performed in order to assess the heating effect of the ions 16 impinging on the object 18. The interaction between different laser-generated proton spectra and objects was simulated with an energy deposition code, in which the laser-generated proton beam 16, as an example of accelerated ion beam, was modelled as the projection of a proton virtual point source with diverging rays, generating a proton source with a diameter of 50 µm [32], with the laminarity of the beam calculated as indicated in [33]. The half-angle divergence (α) of the proton beam 16 was adjusted, typically between about 10 and 20 degrees, depending on the on the energy of the protons [34]. Within the opening angle (2α) of the proton beam 16, all particles were uniformly distributed. This modelling is standard in the field of laser-plasma interaction for measuring proton-induced heating effects [35].

Since the laser-driven proton yield is heavily dependent on the laser used, different lasers were considered as follows:

1) very high-energy, longer pulse lasers: these are currently difficult to obtain commercially, such as the LLNL-TITAN laser (maximum energy: up to 220 J, typical pulse duration: 700 fs, central wavelength: 1.056 µm, repetition-rate<<1 Hz) [36, 37];

2) high-energy, long pulse lasers: these are also currently difficult to obtain commercially, but not out of reach for industry, such as the LULI-ELFIE (30 J, 350 fs, 1.056 µm, rep-rate<<1 Hz) [38];

3) high energy, short pulse lasers: these may currently be obtained commercially as 1 PW lasers, such as the ASTRA-GEMINI (10 J, 45 fs, 800 nm, envisioned rep-rate for future facilities 5-10 Hz (e.g. at the Extreme Light Infrastructure) [39]); and 4) high-energy, short pulse lasers: these are currently commercially available as 100-500 TW lasers, such as the FZD-DRACO laser for example (5 J, 25 fs, 800 nm, rep-rate 10 Hz) [40].

Figure 1B:
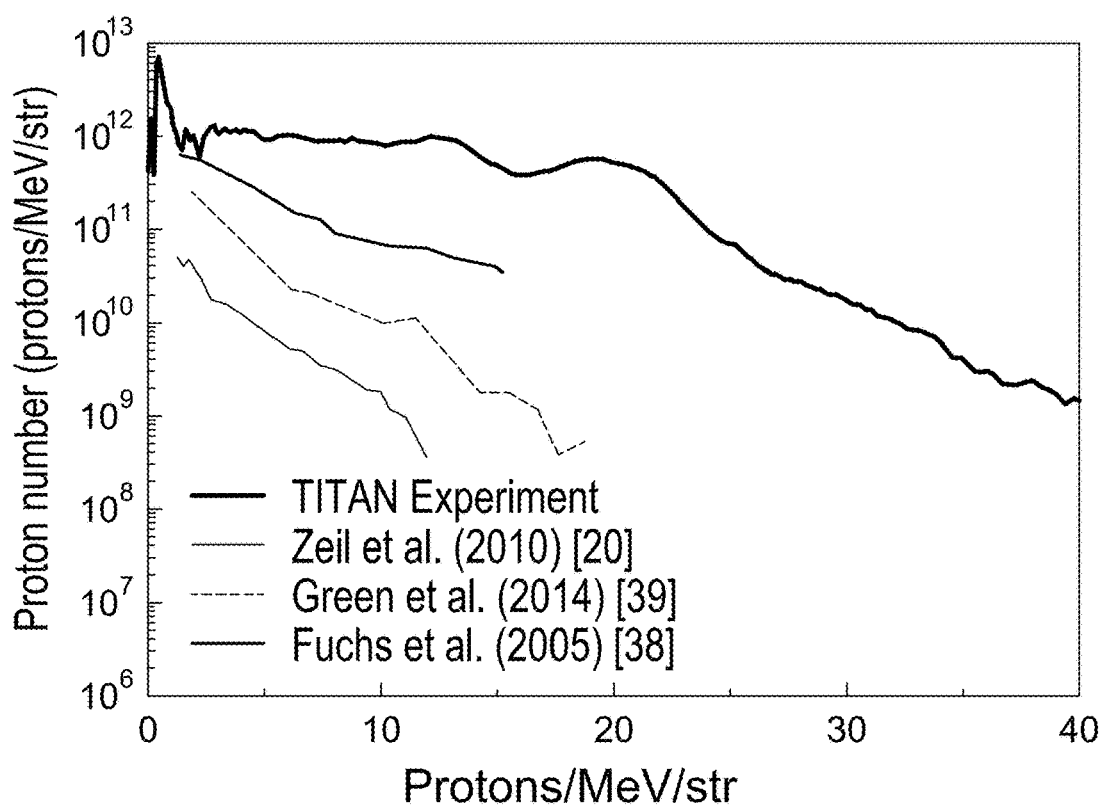
FIG. 1B shows comparison of different proton spectra obtained with four different laser-facilities operating in different energy/pulse duration ranges; the high-power laser (TITAN) spectrum was obtained during an experimental campaign; all other spectra are extracted from references cited herein.

A comparison of the different spectra obtained using these different types of lasers is shown in FIG. 1B. The high-power laser spectrum TITAN was obtained during an experimental campaign described hereinbelow.

As a starting point for the simulations, the spectra having the most particles, i.e. the spectra obtained with the high-power laser, in the present case with the high-power laser TITAN (see 1) hereinabove), were used since having a high proton flux was expected to allow performing a "one-shot" PIXE analysis. However, it was also expected that this proton flux would be heating the irradiated object to the highest temperatures, therefore in a so-called "worst case scenario". A number of material categories of interest in the Cultural Heritage (CH), which include bronzes, marbles (stone carbonates), noble metals (gold, silver) and ceramics for example, were considered.

Figure 2A:
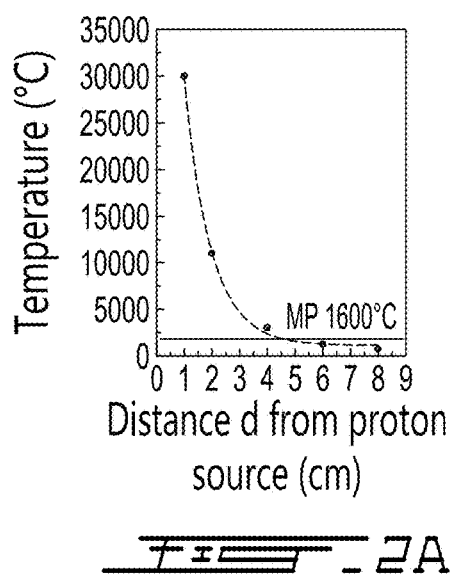
FIG. 2A shows simulated maximum temperature vs. distance from the proton source, in a ceramic artifact when irradiated with a laser-generated proton beam as obtained on a high-power laser.

In the simulations, the objects 18 were positioned at different distances (d) from the proton source 14 and the heating effect was evaluated. On the one hand, the temperature within the objects had to be kept below the melting point, and, on the other hand, the more proton flux irradiates the objects, the more X-ray emission occurs, which improves the signal-to-noise ratio of the diagnostic. In the experiments performed, a high-power laser with a strong proton yield was used and the object was a ceramic object; given this proton yield and a melting point of about 1600° C. for ceramics, the optimum distance between the object and the proton source was found to be about d=6 cm (see FIG. 2A).

Figure 2B:
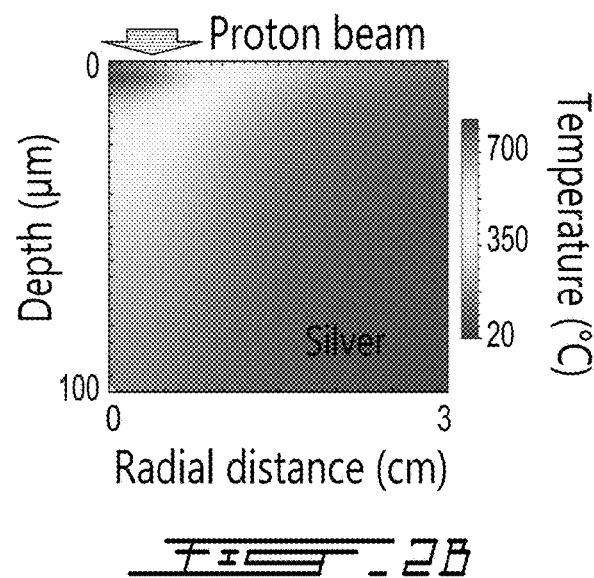
FIG. 2B shows a temperature map of a silver object irradiated by a laser-generated proton beam as obtained on a high-power laser, when the object has reached its maximum temperature, the object being located at 6 cm from the proton source; the 0 level indicates the object surface in front of the proton beam, with the protons impinging from the top; only the first 100 μm of the object surfaces are shown.
Figure 2C:
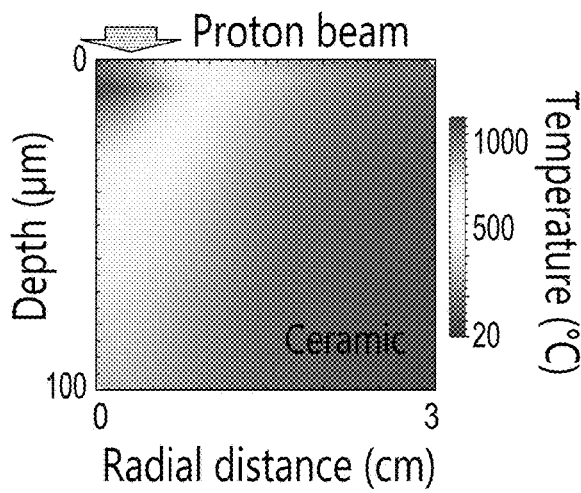
FIG. 2C shows a temperature map of a ceramic object, irradiated by a laser-generated proton beam generated by a high-power laser, when the object has reached its maximum temperature, the object being located at 6 cm from the proton source; the 0 level indicates the object surface in front of the proton beam, with the protons impinging from the top; only the first 100 μm of the object surfaces are shown.
Figure 2D:
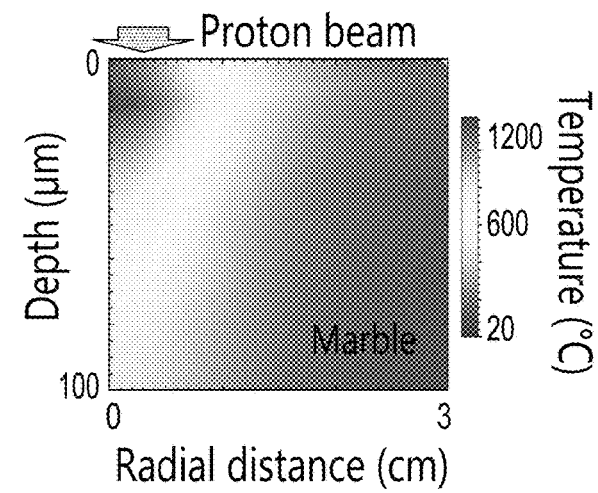
FIG. 2D shows a temperature map of a marble object irradiated by a laser-generated proton beam as obtained on a high-power laser, when the object has reached its maximum temperature, the object being located at 6 cm from the proton source; the 0 level indicates the object surface in front of the proton beam, with the protons impinging from the top; only the first 100 μm of the object surfaces are shown.

The maximum temperature maps obtained for silver, ceramic and marble objects respectively, as examples of common CH materials, when irradiated by the laser-accelerated proton beam, are shown in FIGS. 2B, 2C and 2D. It can be seen that within the entire objects the temperature stays safely (~25%) below the melting point for all the considered materials, the melting points for marble, silver and ceramic being respectively about 1400, 960 and 1600° C. Simulations revealed that the temperature stays almost constant for about 1 ns before the cooling phase starts and then the objects cool down almost completely in a few tens of ns.

These simulations were validated by a series of experiments performed on the high-power TITAN laser of the Jupiter Laser facility (Laurence Livermore National Laboratory—LLNL), producing laser pulses of about 220 J in 700 fs and operating at a wavelength of 1.054 µm [36]. The laser beam, focused down to a beam diameter of about 9 µm focal spot diameter (FWHM) producing an on-target intensity of $I \sim 10^{20}$ W/cm, was used for interacting with a commercially available solid target in order to accelerate protons in the laser-forward direction using the TNSA [42] mechanism. The Amplified Spontaneous Emission (ASE) was measured to be below $10^{-6}$ in contrast, i.e. delivering about 10 mJ in energy. As proton sources, commercially available solid 15 µm Au or Al targets were used. The incident laser beam was tilted by 10° with respect to the target normal direction (see FIG. 1A) in order to differentiate between the trajectories of the protons stemming out normally from the back surface, and the electrons following the laser-direction. Two calibrated Thomson parabolas (TPs) and spectrometers located at 0° (TP 0°) and 9° (TP 9°) with respect to the main pulse laser axis were used to measure the forward generated proton spectrum. The Thomson parabolas (TPs) were placed at a distance of 690 mm and 565 mm respectively from the proton source (distance to the entrance slit). Proton spectra measured by the Thomson parabolas (TPs) were readout in an absolute manner [43, 44] using image plates (IP) of the type BAS-TR 2025 from Fuji Photo Film Co. Ltd that were analyzed using a FUJIFILM FLA-7000 reader. Additional measurements of the proton spectra were obtained using Radio Chromic Films (RCFs) of the type HS that allowed obtaining a beam spatial distribution. A typical laser-generated proton spectrum obtained during the experiment is shown in FIG. 1B. The laser-generated protons were impinging the object with an incidence angle of 10°.

Figure 3A:
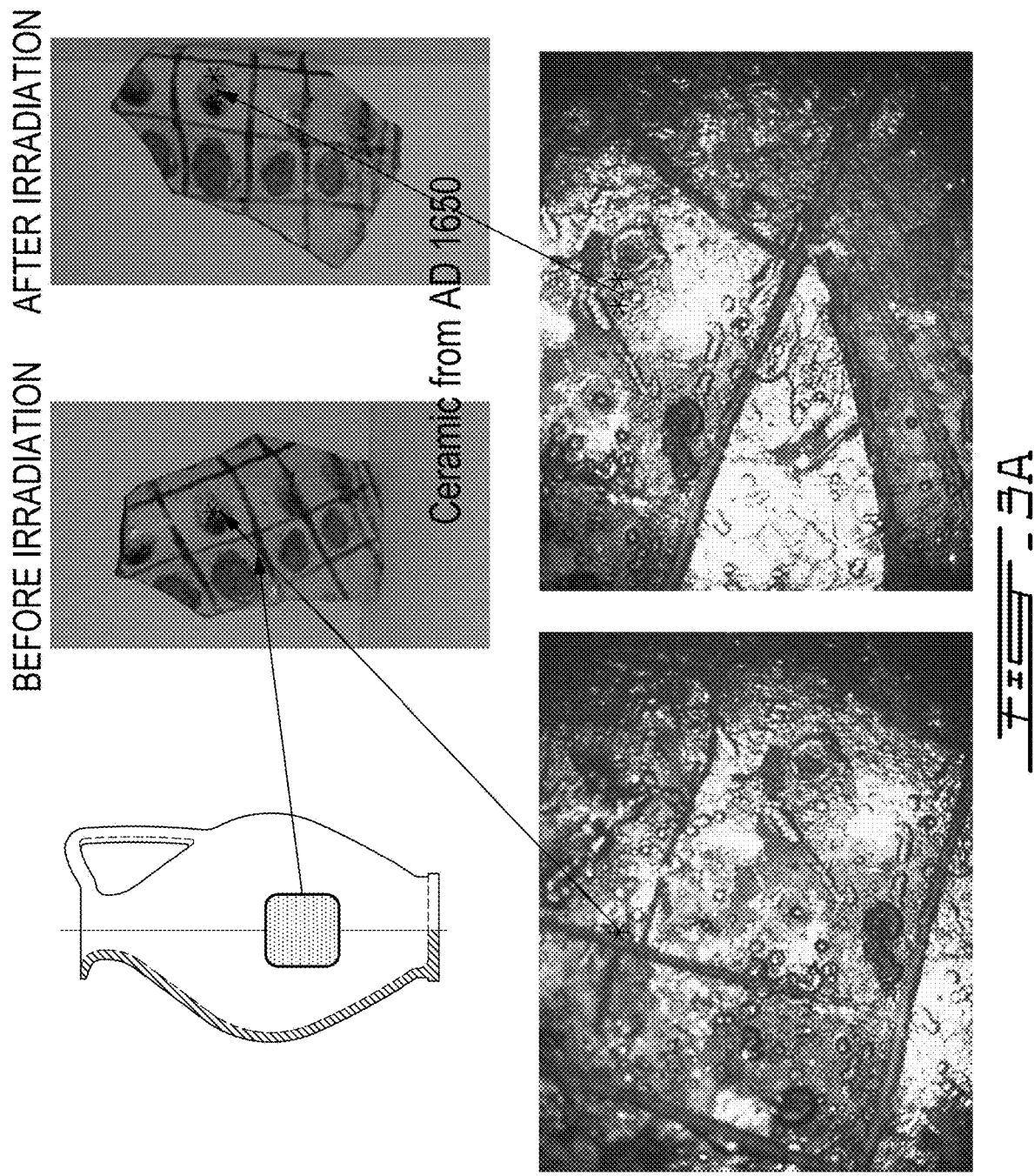
FIG. 3A shows archeological artefacts and details about ceramics used for testing damaging effect of laser-generated protons according to an embodiment of an aspect of the present invention, before and after the irradiation.

Pure silver (97%, thickness 200 µm, impurities of Cr, Ti and Cu, manufacturer: Goodfellow), gold and bronze (manufacturer Goodfellow, thickness 200 µm: gold 99.95%, bronze Pb<200, Sn 4.5-7.5%, P 200-4000, total impurities 2000, Cu balance), pure Carrara marble (provider: Le pietre srl), and one ancient ceramic (taken from the medieval archaeological situ of Nicastro, South of Italy, see FIG. 3A; provider: Sovraintendenza ai Beni Culturali of the Region of Calabria, Italy) were used as objects 18. The latter is a decorated fragment of an amphora (FIG. 3A) dated year 1650 AD [45].

Figure 3B:
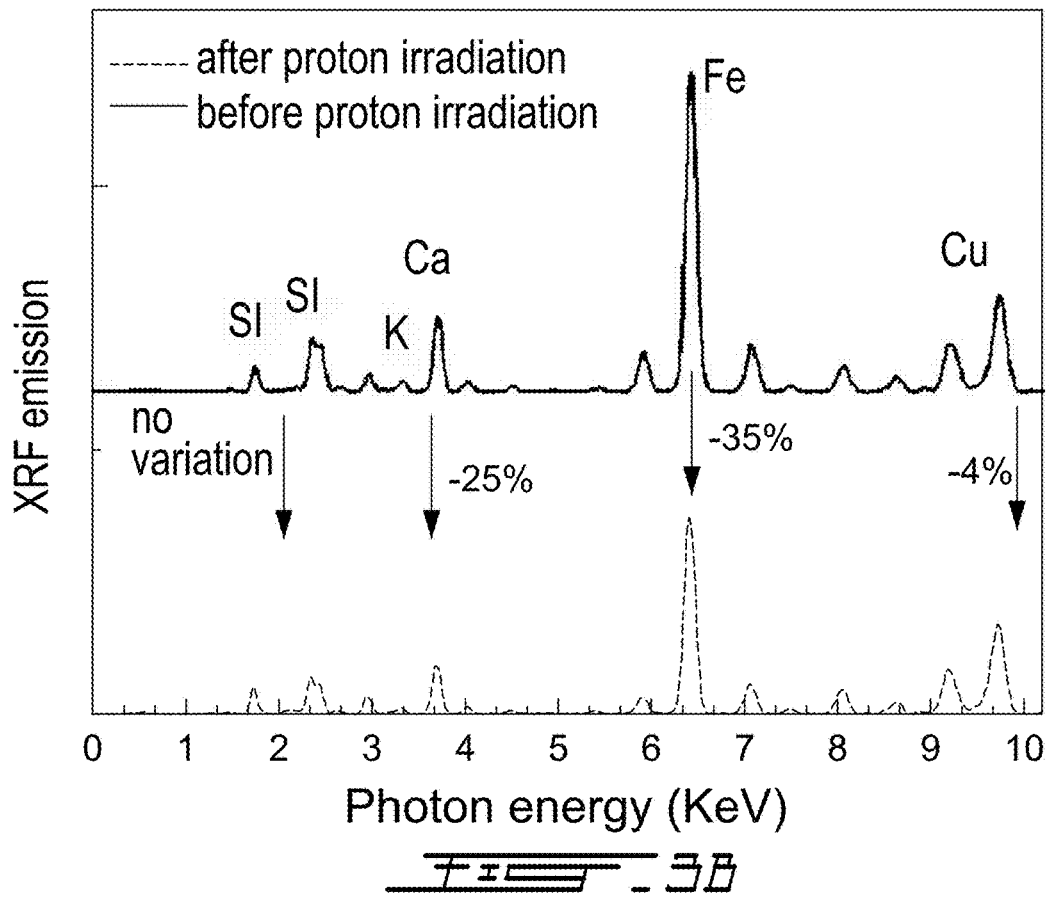
FIG. 3B is an XRF curve of an object before (full line) and after (dashed line) proton irradiation.

All objects were located at a distance (d) of 6 cm from the proton source 14. At first, the effect of the proton irradiation on the object surfaces was observed, by morphological and chemical analysis on all the irradiated materials before and after the irradiation had been performed. All tests performed on the irradiated objects indicate nonperturbative morphological or chemical changes on the objects. FIG. 3 shows the results obtained for the ceramic object, as an example for all. Morphological analysis conducted by optical microscope indicated the absence of fractures and cracks on the surface, while chemical analysis, conducted by EDX analysis under SEM conditions, showed the absence of chemical changes on the surface and in the bulk, within an analysed depth of 10 microns.

The comparison between the XRF emission before and after irradiation (see FIG. 3B) shows a slight decrease of the Ca, Fe and Cu lines. However, this effect was not recognizable by eye and also occurs in conventional irradiation methods.

Figure 3C:
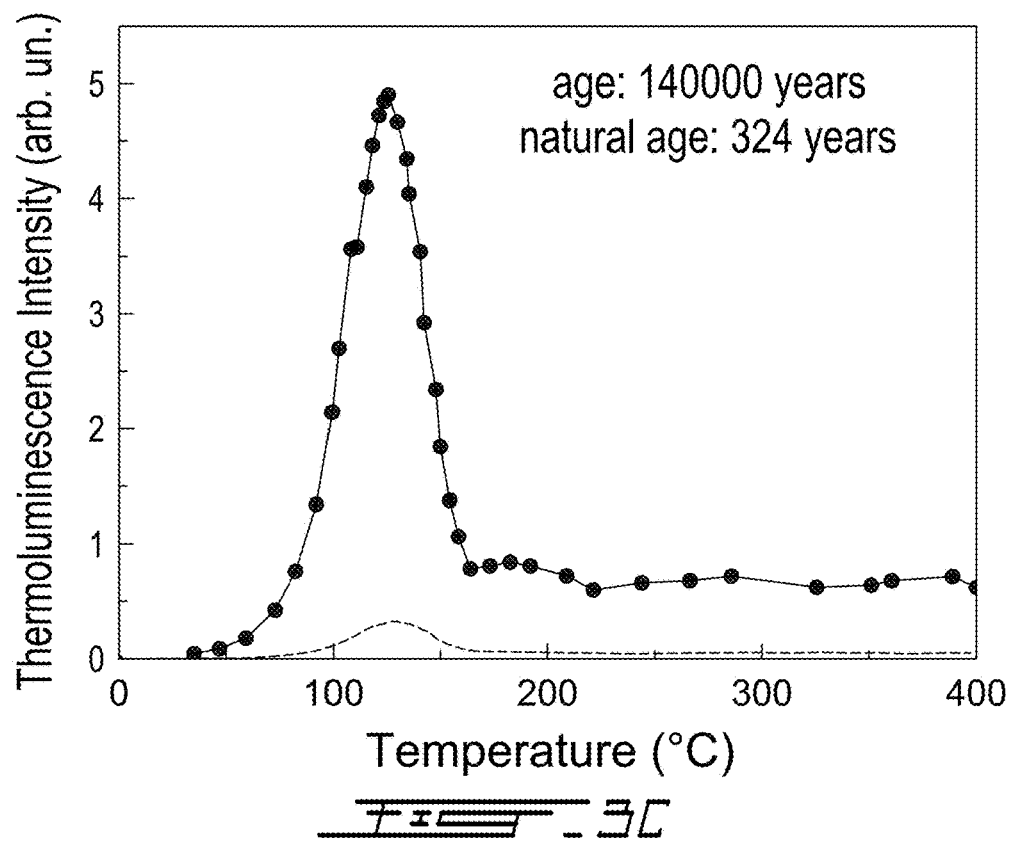
FIG. 3C shows thermoluminescence (TL) emission before (full line) and after laser-driven proton irradiation (dashed line)

Thus, similar to when applying these conventional methods, the dating of the artefact may not be obtained, because the dose accumulated during the irradiation strongly affects the thermoluminescence. Thermoluminescence (TL) methods for analysing a range of artefacts are based on the amount of radiative dose cumulated during the artefact's lifecycle, referred to as the paleodose [46]. The age of the object is evaluated as the ratio between the Paleodose (specified in Gy) and the Dose Year (Gy/year) of the archaeological site. Irradiation by high energetic protons can significantly change the radiation cumulated into the artefact, changing the paleodose and affecting the dating process. The non-applicability of thermoluminescence dating techniques was tested ([45]). FIG. 3C shows the thermoluminescence (TL) emission before (100× magnified) and after laser-driven proton irradiation. The artefact would be dated with an age of 140000 years instead of 324.

Figures 4A, 4B:
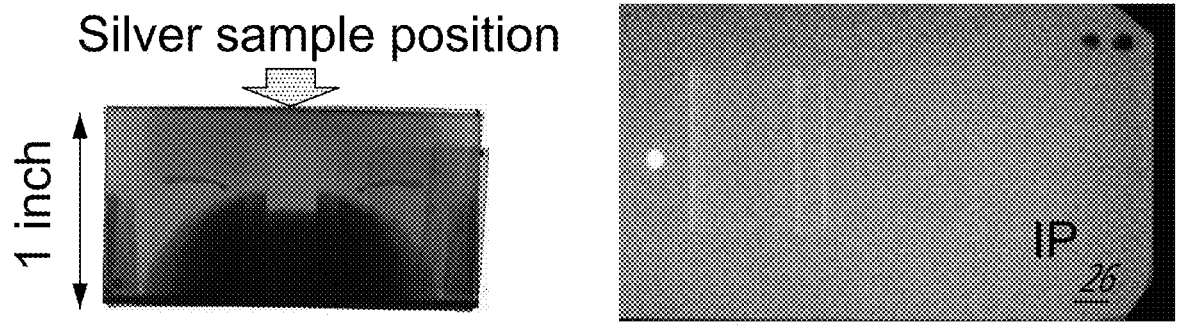
FIG. 4A shows a silver object mounted in front of a radio chromic film (RCF) indicating the footprint of the laser-generated proton beam.
FIG. 4B shows an image plate (IP) positioned behind the X-ray spectrometer showing different lines and the zero-order.

Having optimised the distance (d) between the object 18 and the proton source 14 for not damaging the object 18, the laser-generated proton emission was then tested. The proton-induced X-ray emission produced by the interaction of the laser-accelerated proton beam 16 with the object 18 was measured at an angle of 10° with an X-ray spectrometer 22 sensitive to photons with energy ranging from fractions of keV, i. e. from about 0.5 keV, to about 80 keV [46] and using as detector 26 image plates of the type BAS-TR2025 which were readout by the same image plate scanner as for the proton diagnostic as described hereinabove. A stack of radio chromic films (RCF) 24, of the HD type, was placed behind the object 18 in order to verify the centering of the proton beam onto the object 18 (see FIG. 1A). Due to the limited sensibility range of the spectrometer 22, the validity of the method was tested on the silver object, since all other materials had their K emission energies outside the main detectable spectral range of the spectrometer 22. The results of a single-shot particle-induced X-ray emission (PIXE) conducted on silver are shown in FIGS. 4. As visible on the radio chromic film (RCF) 24 positioned behind the object 18 (see FIGS. 1 and 4A), the silver object 18 was fully covered by the proton beam 16, i.e. the proton beam 16 irradiating a surface of several cm². The image plate 26 of the spectrometer 22 shows three well-defined bands corresponding to the Ag K (first order) and L (second order) bands, as evaluated from the Bragg law:

$$\lambda = 2d\sin\frac{\vartheta}{2} \quad (1)$$

$$E = \frac{hcR}{2dx} \quad (2)$$

where, λ and E are the wavelength and the energy of the induced X-rays, θ the diffraction angle, x is the distance of the line from the zero-order, d is the lattice parameter of the crystal (for silver d=0.68 nm), R is the distance between the image plate 26 and the crystal 18 (see FIG. 5) (here 0.1 m)).

Figure 4C:
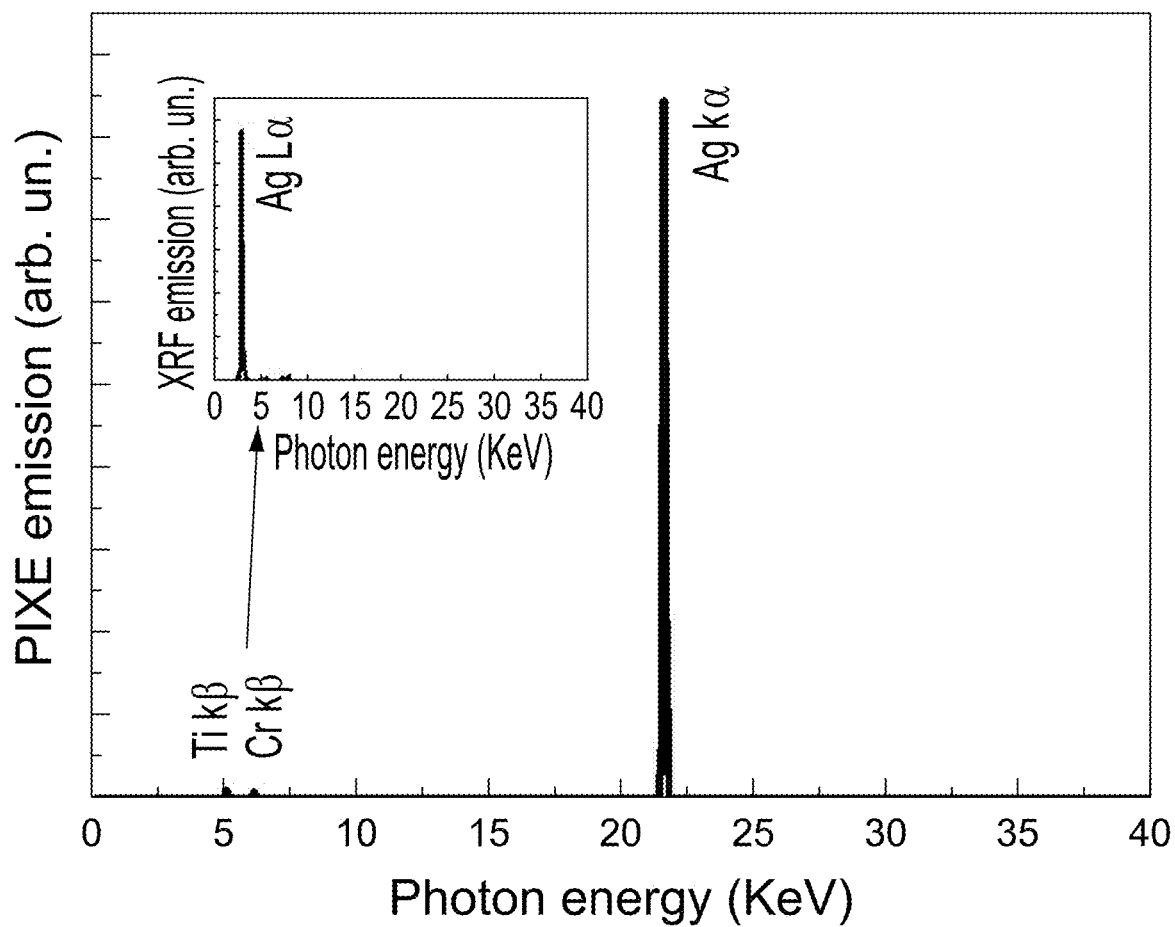
FIG. 4C shows a convoluted spectrum obtained by Bragg analysis on the image plate (IP) shown in FIG. 4B.

The convoluted spectrum (Gaussian convolution, obtained using the cross sections for each line [47]) is shown in FIG. 4C. The leftmost line, close to the zero-order (the intense round spot in FIG. 4B), corresponds to the first order K-alpha line (22.2 keV) while the two adjacent lines on the right handside can be attributed K-alpha lines of Ti and Cr respectively (4.93 and 5.94 keV). The one-shot particle-induced X-ray emission (PIXE) data are in perfect agreement with those obtained by conventional XRF on the same object, which indicates the presence of the L-alpha line of Silver (3 keV) and K-alpha lines of Ti (4.93 keV), Cr (5.94 keV), and Cu (8.97 KeV). The above-obtained results confirm the feasibility of laser-accelerated proton-induced X-ray emission (PIXE), even on larger surfaces than with conventional methods, in a single sub-ns laser shot.

The experimental validation was performed using laser-accelerated protons obtained using a high-power lasers. Commercially available lasers have a higher repetition rate [39, 40], but the integrated number of protons is typically at least one order of magnitude lower than what was obtained on the high-power laser (see FIG. 1B). However, the lack of proton flux may be balanced by cumulating a certain number of shots, for reproducing the same X-ray signal as obtained during one single shot on a high-power laser. For example, a proton flux deficit ratio of 100 on a 10 Hz laser can be balanced with 100 consecutive shots, ideally lasting 10 s in a high-repetition rate setup. Given the lower proton flux, the temperature conditions, i.e. such that the objects stay safely below melting point of the material thereof, are still warranted. Even when using higher-repetition rate lasers, for example up to 100 Hz, the time interval between two consecutive shots is sufficiently long to allow the object to cool down so that the cumulative effect of the shots does not result in damages to the artifact even at higher repetition rate operation.

Punctual analysis on different layers, at different depths within the object may be needed if the object exhibits zones that require further, i.e. more precise, investigation, for example in search of harmful elements. To perform such layer analysis, an energy selector 15, i. e. a device that selects a fraction of the proton beam within the entire broad-band spectrum of the proton beam around a tunable central energy and reduces the energy-spread of the protons [48, 49], is placed between the proton source 14 and the object 18. Since protons deposit most of their energy at the end of their trajectory (Bragg peak), the energy selector 15 allows performing the analysis on different layers of the object 18 with a depth precision depending on the allowable energy spread. Moreover, the energy selector 15 can easily and rapidly change its central energy, since it typically comprises a movable slit, which selects the central energy out of the broad-band proton spectrum and may be moved with sub-s velocity.

Analysis of artifacts using smaller spot sizes may be done for example by placing particle focusing devices 17 such as quadrupoles inside the proton beam in front of the artifact 18 [50].

As illustrated for example in FIGS. 4B and 4C, the present method relies on the detection of peaks within the X-ray emitted spectrum.

The present method comprises selected a number of parameters, such as: a) the number of photons emitted by the object under analysis per shot, which depends on the quantity of impinging protons; b) the acceptance of the X-ray spectrometer 22, i. e. the number of photons emitted by the object under analysis that may enter the spectrometer, and are then directed to the detector 26, and c) the sensitivity of the detector 26, which was an image plate in the example illustrated hereinabove.

In examples presented herein, a single high-power laser shot and a spectrometer 22 with good acceptance, i.e. a solid angle of about up to $1^{e-3}$, was sufficient to identify a clear signal on a very sensitive imaging plate 26. If using lower energy, higher repetition lasers, a few shots may be needed in order to have such a clear signal, evidently depending on the sensibility of the detector 26 and acceptance of the spectrometer 22.

Thus, the present system and method use laser-accelerated protons for a chemical analysis on large surface areas and volumes of artworks, with analyzed surfaces of the order of cm$^2$. A layer by layer analysis may also be achieved by using an energy selector, for tuning the proton beam energy from a few MeV to tens of MeV within a very short timescale; and depending on the laser, a high punctual dose my be obtained in one or more shots.

The system comprises a high-power laser able to produce an intensity on target of at least $10^{15}$ W/m$^2$ in a short duration, i.e. pulse duration of at most 1 ns, able to generate protons or heavier ions over laser-matter interaction, i.e. by irradiation of the target, and for generation of a high particle flux within a large opening beam; typically the flux is at least $10^{12}$ ions/mass unit per shot; for lower yields several shots might be required for an analysis of the object.

Materials that may be thus analyzed are materials that withstand the heating induced by the impinging particles.

The system comprises an X-ray spectrometer with an X-ray detector, for detecting X-rays emitted from the probed object under irradiation by the laser-accelerated ion beam. The energy range of the X-ray spectrometer is selected to be compatible with the expected emitting spectrum of the object; for example, in the case of an object in pure silver, the X-ray spectrometer is selected to be sensible to energies of about 22 eV. The sensibility of the X-ray detector is selected to be sufficient to detect the emitted X-rays by the object within a reasonable number of laser shots generating the ions.

Using laser-accelerated ions allows a higher punctual dose on the probed objects, as compared with laser-plasma accelerators during one shot, which allows an enhanced signal-to-noise ratio and therefore a readout that is less damaging to the probed objects than using a continuous accelerator, in which case the dose needs to be accumulated over long periods of time so as to yield a signal sufficient for measurements.

There is thus provided a system and a method for characterizing artifacts, using laser-accelerated ion beams. In the described experiments, it was shown that laser-accelerated proton beams can be used in the field of Cultural Heritage.

Using laser-accelerated ions, as generated by interaction of a laser with a target, the method provides producing ion-induced X-ray spectroscopies (PIXE). By tuning the ion flux on the object under analysis, the method allows performing the PIXE in a single shot without provoking more damage to the object than conventional methods. This was verified by experimentally irradiating materials of interest in the Cultural Heritage with laser-accelerated protons and measuring the PIXE emission. The morphological and chemical analyses of the objects before and after irradiation were compared in order to assess the damage provoked to the objects. Energy deposition simulations confirmed that the temperature in the objects remained safely below the melting point.

The scope of the claims should not be limited by the embodiments set forth in the examples, but should be given the broadest interpretation consistent with the description as a whole.

REFERENCES

[1] Baglioni P., Carretti E. and Chelazzi D., Nanomaterials in art conservation, *Nature Nanotechnology* 10, 287-290, (2015)

[2] Bawaya M., Salvaging Science, *Science* 347, 6218, 117-119 (2015)

[3] Chiari G., Saving art in situ, *Nature* 453, 159 (2008)

[4] Artioli G., Scientific Methods and Cultural Heritage, *Oxford University Press*, Oxford (2010)

[5] Bitossi G., Giorgi R., Mauro M., Salvadori B., and Dei L., Spectroscopic techniques in cultural heritage conservation: a survey, *Applied Spectroscopy* Reviews 40, 187-228 (2005)

[6]. Carbó A. D, Electrochemistry for conservation science, *J. Solid State Electrochem.* 14, 349-351 (2010)

[7] Grassi N. et al., Differential PIXE measurements for the stratigraphic analysis, *X-ray Spectrom.*, 34, 306-309 (2005)

[8] van Grieken R. E., Markowicz A. A., Handbook of X-Ray Spectrometry, second edition, Marcel Dekker, Inc, New York (2002)

[9] Giarola M., Mariotto G., Barberio M., Ajò D., Raman spectroscopy in gemmology as seen from a 'jeweller's' point of view, *Journal of Raman Spectroscopy* 43, 1828-1832 (2011)

[10] Salomon J. et al., Cultural heritage materials: art conservation and restoration, *Appl. Phys. A* 92, 93 (2008)

[11] La recherche au musée du Louvre 2012, *Musée du Louvre, Paris, ISBN* 978-2-35031-483-9 and Louvre Laboratory web site: http://c2rmf.fr/[12]

[12] Massi M., Giuntini L., Chiari M., Gelli N., Mandò P. A., The external beam microprobe facility in Florence: Set-up and performance, *Nucl. Instr. and Meth. B* 190, 276-282 (2002)

[13] Giuntini L., Massi M., Calusi S., The external scanning proton microprobe of Firenze: A comprehensive description, *Nucl. Instr. and Meth. A* 576, 266-273 (2007)

[14] Janssens K., Van Grieken R., Non destructive microanalysis of Cultural Heritage Materials, Wilson 6 Wilson's, Amsterdam (2004)

[15] Fuchs J. et al., Laser-driven proton scaling laws and new paths towards energy increase, Nature Physics 2, 48-52 (2006)

[16] Robson L. et al., Scaling of proton acceleration driven by petawatt-laser-plasma interactions, *Nature Physics* 3, 58-62 (2007)

[17] Cowan T. E. et al., Ultralow Emittance, Multi-MeV Proton Beams from a Laser Virtual-Cathode Plasma Accelerator, *Phys. Rev. Lett.* 92, 204801 (2004)

[18] Buffechoux, S. et al., Hot Electrons Transverse Refluxing in Ultraintense Laser-Solid Interactions, *Phys. Rev. Lett.* 105, 015005 (2010)

[19] Fourmaux S. et al., Investigation of laser-driven proton acceleration using ultra-short, ultraintense laser pulses, *Phys. Plasmas* 20, 013110 (2013)

[20] Zeil, K. et al., The scaling of proton energies in ultrashort pulse laser plasma acceleration, *New J. Phys.* 12, 045015 (2010)

[21] Bulanov S. V. and Khoroshkov V. S., Feasibility of using laser ion accelerators in proton therapy, *Plasma Phys. Rep.* 28, 453-456 (2002)

[22] Malka V. et al., Pratictability of proton therapy using compact laser systems, *Med. Phys.* 31, 1587-1592 (2004)

[23] Roth M. et al., Fast Ignition by Intense Laser-Accelerated Proton Beams, *Phys. Rev. Lett.* 86, 436-439 (2001)

[24] Romagnani L. et al., Dynamics of electric fields driving laser acceleration of multi-MeV protons, *Phys. Rev. Lett.* 95, 195001 (2005)

[25] Antici P. et al., A compact post-acceleration scheme for laser-generated protons, *Phys. Plasmas* 18, 073103 (2011)

[26] Antici P. et al., Numerical study of a linear accelerator using laser-generated proton beams as a source, *Journal of Appl. Physics* 104, 124901 (2008).

[26B] Chen S. et al., Collimated protons accelerated from an overdense gas jet irradiated by a 1 µm wavelength high-intensity short-pulse laser, *Scientific Reports* 7 13505 (2017)

[26C] Gauthier M. et al., High-intensity laser-accelerated ion beam produced from cryogenic micro-jet target, *Rev. Sci. Instrum.* 87 (11) (2016)

[26D] Schleifer E. et al., Proton Acceleration by Ultrashort Intense Laser Interaction with Microstructured Snow Targets, Appl. Sci., 5, 459-471 (2015); BArberio M., et al., M. Barberio, M. Sciscò, S. Veltri, P. Antici, Fabrication of nanostructured targets for improved laser driven proton acceleration, Superlattices And Microstructures 95, 159 (2016)

[27] Yogo A. et al., Application of laser-accelerated protons to the demonstration of DNA double-strand breaks in human cancer cells, *Appl. Phys. Lett.* 98, 053701 (2011)

[28] Metzkes J. et al., Preparation of laser-accelerated proton beams for radiobiological applications, *Nucl. Instr. and Meth. A* 653, 172 (2011)

[29] Doria D. et al., Biological effectiveness on live cells of laser driven protons at dose rates exceeding 109 Gy/s, *AIP Advances* 2, 011209 (2012)

[30] Bin J. et al., A laser-driven nanosecond proton source for radiobiological studies, *Appl. Phys. Lett.* 101, 243701 (2012)

[31] Busold S. et al., Towards highest peak intensities for ultra-short MeV-range ion bunches, *Scientific Reports* 5, 12459 (2015)

[32] Borghesi M. et al., Multi-MeV Proton Source Investigations in Ultraintense Laser-Foil Interactions, *Phys. Rev. Lett.* 92, 055003 (2004)

[33] Cowan T. E. et al., Ultralow Emittance, Multi-MeV Proton Beams from a Laser Virtual-Cathode Plasma Accelerator, *Phys. Rev. Lett.* 92, 204801 (2004)

[34] Mancic A. et al., Isochoric heating of solids by laser-accelerated protons: Experimental characterization and self-consistent hydrodynamic modeling, *High Energy Density Physics* 6, 21 (2010)

[35] Patel P. K. et al., Isochoric Heating of Solid-Density Matter with an Ultrafast Proton Beam, *Phys. Rev. Lett.* 91, 125004 (2003)

[36] TITAN Laser characteristic: https://jlf.llnl.gov/(2015) (Date of access: May 5, 2016)

[37] Albertazzi B. et al., Longitudinal proton probing of ultrafast and high-contrast laser-solid interactions, EPJ Web of Conferences 59, 17014 (2013)

[38] Fuchs J. et al., Comparison of Laser Ion Acceleration from the Front and Rear Surfaces of Thin Foils, *Phys. Rev. Lett.* 94, 045004 (2005)

[39] Green J. S. et al., High efficiency proton beam generation through target thickness control in femtosecond laser-plasma interactions, *Appl. Phys. Lett.* 104, 214101 (2014)

[40] Zeil K. et al. The scaling of proton energies in ultrashort pulse laser plasma acceleration, *New J. Phys.* 12, 045015 (2010)

[41] Antici P. et al., Isochoric heating of matter by laser-accelerated high-energy protons, *J. Phys. IV* 133, 1077-1079 (2006)

[42] Wilks S. C., Kruer W. L., Tabak M. and Langdon A. B., Absorption of ultra-intense laser-pulses, *Phys. Rev. Lett.*, 69, 1383 (1992)

[43] Mancic A., Fuchs J., Antici P., Gaillard S. A., and Audebert P., Absolute calibration of photostimulable image plate detectors used as (0.5-20 MeV) high-energy proton detectors, *Rev. Sci. Intrum.*, 79, 073301 (2008)

[44] Bonnet T., et al, *Rev. Sci. Instrum.*, Response functions of Fuji imaging plates to monoenergetic protons in the energy range 0.6-3.2 MeV, 84, 013508 (2013)

[45] Renzelli D et al., SAR TL dating of neolithic and medieval ceramics from Lamezia, Calabria (South Italy): a case study, *Mediterranean Archaeology and Archaeometry,* 13, 1, 277 (2013)

[46] Seely J. F. et al., K-shell spectra from Ag, Sn, Sm, Ta, and Au generated byintense femtosecond laser pulses, *High Energy Density Physics* 3, 263 (2007)

[47] Cohen D. D., Harrigan M. Atomic Data Nucl Data Tables, 33, 255 (1985)

[48] Chen S. N. et al., Monochromatic short pulse laser produced ion beam using a compact passive magnetic device, *Rev. Sci. Instrum.* 85, 043504 (2014)

[49] Scuderi V., et al., Development of an energy selector system for laser-driven proton beam applications, *Nuclear Instruments and Methods in Physics Research A,* 740, 8793 (2014)

[50] Schollmeier M. et al., Controlled Transport and Focusing of Laser-Accelerated Protons with Miniature Magnetic Devices, *Phys. Rev. Lett.* 101, 055004 (2008)

The invention claimed is:

1. A spectroscopy method, comprising irradiating an object with a laser-accelerated particle beam and detecting photons emitted by the object as a result of the interaction between the laser-accelerated particle beam and the object, wherein the method comprises tuning a particle flux impinging on the object and tuning least one of i) polychromaticity of the laser-accelerated particle beam and ii) an angular opening of the laser-accelerated particle beam according to at least one of: i) a thickness of the object to be examined and ii) a spatial area of the object to be examined.

2. The method of claim 1, comprising positioning a particle source at a distance from the object, and generating the laser-accelerated particle beam by irradiating the particle source with a laser.

3. The method of claim 1, comprising positioning a particle source at a distance from the object, and generating the laser-accelerated particle beam by irradiating the particle source with a laser, wherein the distance between the particle source and the object is selected based on at least one of: i) a particle yield of the interaction, and ii) the melting point of the material of the object.

4. The method of claim 1, wherein said detecting the photons comprises collecting the photons using a spectrometer and a detector.

5. The method of claim 1, wherein said detecting the photons comprises collecting the photons using a spectrometer, the method comprising selecting an energy range of the spectrometer according to an emitting spectrum of the object.

6. A spectroscopy method, comprising irradiating an object with a laser-accelerated particle beam and detecting photons emitted by the object as a result of the interaction between the laser-accelerated particle beam and the object, wherein said detecting the photons comprises using a detector, the method comprising selecting a sensibility of the detector for detection of the emitted photons within a determined number of shots.

7. The method of claim 1, wherein the particle source is one of: a solid target; a gaseous target; a cryogenic target; and a microstructured target.

8. The method of claim 1, comprising selecting a fraction of the laser-accelerated particle beam around a tunable central energy.

9. The method of claim 1, comprising selecting a high-power short-pulse laser.

10. The method of claim 1, comprising selecting a high energy, low repetition laser.

11. The method of claim 1, comprising selecting a low energy, high repetition laser.

12. The method of claim 1, further comprising analyzing the spectrum of the photons.

13. A system for spectroscopy of an object, comprising:
a laser;
a particle source, positioned at a distance from the object;
a spectrometer; and
a detector;
acceptance of the spectrometer and sensibility of the detector being selected depending on said laser;
wherein the particle source generates a laser-accelerated particle beam under irradiation by said laser; and the spectrometer and the detector detect photons emitted from the object under irradiation by the laser-accelerated particle beam within a determiner number of laser shots.

14. The system of claim 13, further comprising an energy selector within the laser-accelerated particle beam.

15. The system of claim 13, further comprising a focusing optic between the laser-accelerated proton beam and the object.

16. The system of claim 13, wherein the laser is a high-power laser able to produce an intensity on the particle source of at least $10^{15}$ W/m$^2$ in a pulse duration of at most 1 ns.

17. The system of claim 13, wherein said laser is one of: a high-power short-pulse laser; a high energy, low repetition laser; and a low energy, high repetition laser.

18. The system of claim 13, wherein said particle source is one of: a solid target; a gaseous target; a cryogenic target; and a microstructured target.

19. The system of claim 13, wherein the distance between the particle source and the object is selected based on at least one of: i) a particle yield of the interaction, and ii) the melting point of the material of the object.

* * * * *